No. 886,617. PATENTED MAY 5, 1908.
R. M. LOVEJOY.
VEHICLE SHOCK ABSORBING APPARATUS.
APPLICATION FILED MAR. 28, 1907.
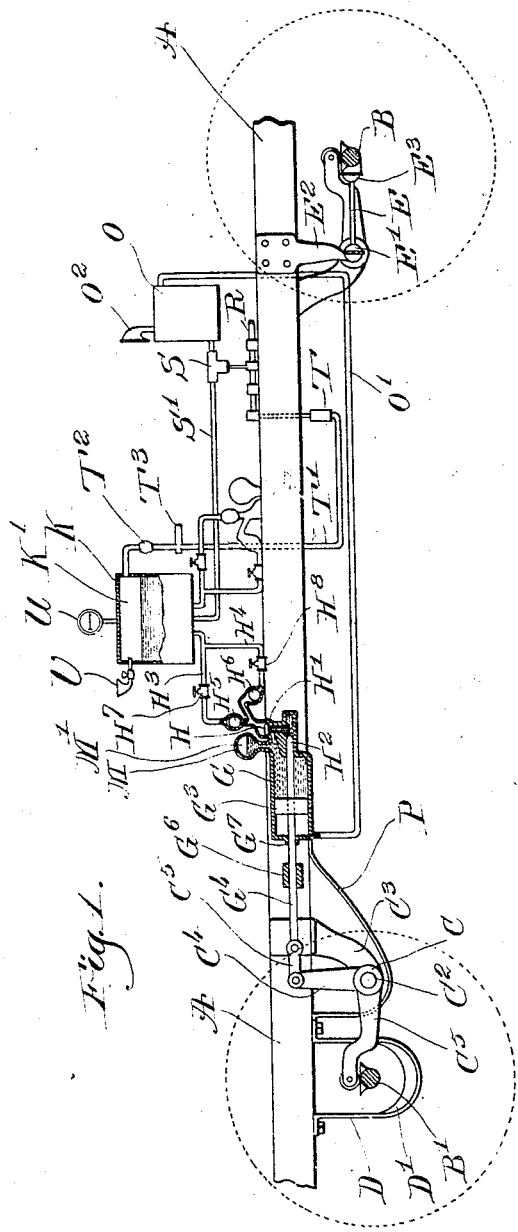
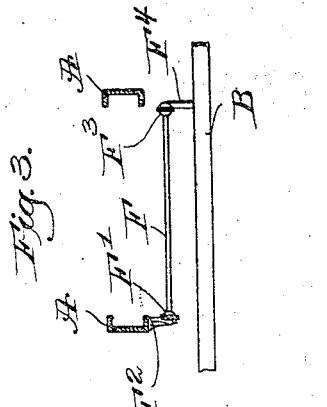
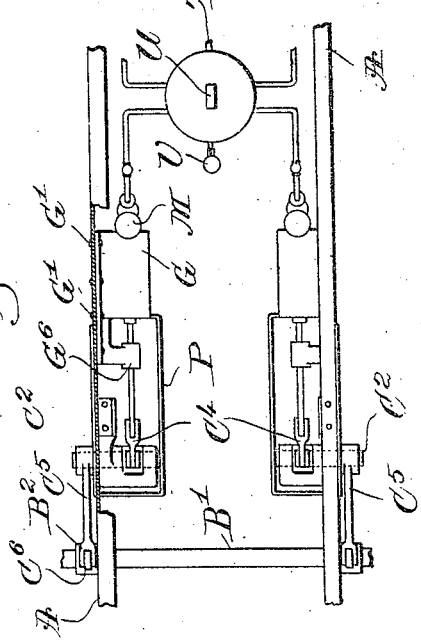
Witnesses.
Thomas J. Drummond
Joseph M. Ward
Inventor.
Ralph M. Lovejoy,
by Crosby & Gregory
Attys.

UNITED STATES PATENT OFFICE.

RALPH M. LOVEJOY, OF MEREDITH, NEW HAMPSHIRE.

VEHICLE SHOCK-ABSORBING APPARATUS.

No. 886,617.  Specification of Letters Patent.  Patented May 5, 1908.

Application filed March 28, 1907. Serial No. 365,149.

*To all whom it may concern:*

Be it known that I, RALPH M. LOVEJOY, a citizen of the United States, and a resident of Meredith, in the county of Belknap and State of New Hampshire, have invented an Improvement in Vehicle Shock-Absorbing Apparatus, of which the following description, in connection with the accompanying drawing, is a specification, like letters on the drawing representing like parts.

This invention relates to an apparatus for taking up or absorbing the shocks and jars occurring in the movement of a vehicle over a road of any description, but it is particularly designed for use in connection with automobiles.

It is well known that springs, pneumatic tires and other devices fail to take care of satisfactorily the shocks and jars which arise in the operation of such vehicles. The present invention is designed to absorb these shocks and jars, and will preferably be used in place of springs or similar devices, and may even render unnecessary the use of pneumatic or elastic tires.

The present invention enables vehicles, such for example as automobiles, to be operated over rough and irregular roadways, without the impartation of disagreeable shocks and jars to the body of the vehicle, and in its preferred form makes use of a compressed air buffer to which the shocks and jars are conveyed through the medium of a liquid.

The invention will appear more fully from the accompanying description and drawings, and will be particularly pointed out in the appended claims.

The drawings represent an apparatus embodying the invention as applied to an automobile, all parts other than those necessary to an understanding of the invention, being omitted.

In the drawings, Figure 1 represents in side elevation and partly in cross-section, a portion of an automobile body and running gear, with a preferred form of the invention adapted thereto; Fig. 2 represents in plan and partly in horizontal cross-section, a portion of the parts shown in Fig. 1; Fig. 3 is a detail showing the means for limiting the sidewise movement between the automobile body and running gear.

The drawing shows the parts arranged in a somewhat conventional manner, necessary in order to illustrate the workings of the apparatus, but it will be obvious that the various parts may be positioned in accordance with the requirements of the particular vehicle and the space available; and that the arrangement may be quite different from that shown for purposes of illustration.

The side bars of the body of the vehicle are represented at A, and the forward and rear axles of the running gear are represented at B and B' respectively, the wheels being indicated by dotted lines. The construction of the body and running gear may be of any desired form, depending upon the uses to which the vehicle is to be put, the only essential point to be noted being that there must be a vertical play allowed between the body and the running gear, and as herein shown, this play takes place between the axles and the body. For this purpose what may be termed bell-crank levers are provided, fulcrumed on the body, and having one arm resting on the axles. In the construction shown four of these bell-crank levers are provided, and all are shown of similar construction. They are represented at C, mounted on stub shafts $C^2$ at the lower end of brackets $C^3$, depending from the vehicle body. Each bell-crank lever is provided with an upright arm $C^4$, by which it is connected to the other parts of the apparatus, and with a horizontally-arranged arm $C^5$, riding at its end upon the axle. As herein shown the axle is fixed against rotation, and is provided with a flat bearing $B^2$ upon which rides an anti-friction roller $C^6$, mounted in the arm $C^5$. This construction is employed to obviate the friction arising from the slight movement back and forth of the arm $C^5$ upon the axle B'.

The parts already described serve of themselves to connect the running gear with the body of the vehicle, but other additional connections may be and usually are provided. At the rear are shown shackles D secured to and depending from the body, surrounding the axle and provided with rubber or resilient pads D', so that in the event of an accident or such an unusual shock as to throw the axle away from the bell-crank lever the axle will be caught and returned by the pad D'. Radius-bars or connections may also be used between the vehicle body and axle, as shown at the forward end of the vehicle, where E represents a radius-bar having at one end a ball-and-socket connection E', with a bracket $E^2$ depending from the vehicle body, and having at the other end a ball-and-socket connection E³ with the axle. A device is also shown suitable for preventing extreme sidewise movement between the running gear and the body in Fig. 3, wherein a rod F is shown, having a ball-and-socket joint F' in a bracket F², depending from one side of the vehicle body, and a ball-and-socket connection F³ in the other end in a bracket F⁴, extending from the axle.

In the preferred form of the invention as illustrated, the relative movement between the vehicle body and the running gear is controlled at each end of each axle separately, and the best results are thereby secured. The controlling elements of the apparatus are therefore in this preferred form quadruple, one being employed at each end of each axle. Each of these elements is also connected in the preferred form with a single equalizing buffer chamber, although it will be seen that it is not essential that but one such buffer chamber be employed, but it is preferred to use one such chamber connected to and communicating with all of the controlling elements of the apparatus.

The controlling element for each end of each axle being, as herein shown, the same in construction, but one need be described in detail. It comprises essentially a liquid chamber, a partition in said chamber movable relative thereto, one of said parts being connected to the vehicle body and the other to the running gear, and a liquid passageway extending from said chamber to the buffer chamber. In its preferred form and combined with additional features which adapt it to secure the best results, it is constructed substantially as shown. The liquid chamber is represented at G as a piston cylinder secured to the vehicle body at G'. The movable partition is shown as a piston G³, the rod G⁴ of which is connected by a link C⁵ to the upper end of the arm C⁴ of the bell-crank lever C. An additional bearing G⁶ for the piston rod is also provided. The liquid passageway from the liquid chamber G to the buffer chamber is shown at H controlled by a valve H' operated by a projection H² extending from the piston.

The buffer chamber used in connection with all of the liquid chambers, as herein shown, is represented as a compression tank K, containing liquid acting against a suitable buffer K' at its upper end, herein shown as compressed air.

The passageway H from the liquid chamber to the buffer chamber may be constructed and arranged in various ways, but as herein shown comprises a dual passageway formed by two pipes H³, H⁴, provided with check-valves H⁵, H⁶, respectively, shown as ball-checks and arranged so that the upward flow of the liquid will always be through the pipe H³ and the downward flow through the pipe H⁴. The size of the pipes should also be controlled in some suitable way, and means for that end are herein shown as valves H⁷, H⁸, by which the flow of the liquid in both directions may be governed.

An important feature of the invention which is preferably employed, resides in the auxiliary buffer chamber M, opening out from the liquid chamber G, and in communication therewith. This chamber is provided with a buffer M', herein shown as compressed air.

The liquid chambers and the buffer chamber, and the various other parts will all be proportioned according to the weight and character of the vehicle and the load to be carried thereby, but the parts can be made of small and compact size requiring to withstand only a moderate degree of pressure.

In the operation of the apparatus as illustrated any slight vibration between the axle and the body of the vehicle will cause a movement of the piston G³, which will be transmitted through the liquid to the air buffer in the auxiliary buffer chamber M, and taken up there. Any extended or sudden vibration will cause the piston G³ to make a further traverse, raise the check-valve H', and force the liquid through the liquid passageway, and in the form shown through that branch of it preferably having the larger area, herein shown as determined by the valves H⁷, H⁸ up into the main buffer chamber K, where the shock will be taken up upon the air buffer K'. The compression of the air buffer will at once cause a re-action, forcing the liquid back through the passageway and preferably through that smaller branch of it shown, into the liquid chamber, and aided by the pressure in the auxiliary buffer chamber will move the piston backward, restoring the parts to normal position and allowing the check-valve H' to close.

The various connections and joints are so arranged as to be readily made air and water tight. The only points where leakage of any consequence is liable to occur is in connection with the pistons G³. The packing G⁷ around the piston-rod is made as tight as possible, but the movement of the piston back and forth in the cylinder naturally tends more or less to suck air, and with it dust, into and out of the cylinder. To obviate this a breathing chamber O is provided, and connected by a pipe O' with the cylinder at the opposite side of the piston from the liquid chamber. The breathing chamber O is provided with a ventilator O², covered with fine wire gauze. It will thus be seen that as the piston moves back and forth it will breathe into and out of the chamber O, and if any slight leakage of the liquid occurs past the piston it will gradually work through the pipe O', into the bottom of the breathing chamber O. Each cylinder may be and preferably is connected to the single breathing chamber O.

A casing P is preferably constructed to cover all the movable parts connected with the cylinder at the piston end to prevent as much as possible the admission of dirt and dust to the bearings and joints.

R represents a shaft driven from some suitable source, and operating a hydraulic pump S in a pipe S' running from the breathing chamber O to the buffer chamber K. This pump may have a slow motion and be kept running continually so that any leakage that may occur may be at once pumped back into the buffer chamber K. The shaft R may also operate an air pump T connected by a pipe T' with the buffer chamber K, and provided with a check-valve T² to prevent the return of the air, and between the pump and the check-valve with a safety valve T³, to prevent the air pressure rising above the desired point.

The air pressure in the buffer chamber K may be ascertained by the employment of a suitable gage U, and the liquid may be supplied in the first instance, or whenever exhausted, to the apparatus by a suitable filling opening V in the upper part of the buffer chamber K. When the liquid is supplied in this manner the pressure is, of course, first removed and then brought up to the required point.

Having described my invention, what I claim as new and desire to secure by Letters Patent, is:

1. Vehicle shock absorbing apparatus comprising a liquid chamber, an imperforate partition therein movable relatively thereto, means for connecting one of the said parts to the vehicle running gear and the other to the vehicle body, a buffer chamber, a liquid passageway connecting the liquid and buffer chambers, a valve in said passageway, and means for controlling the closing movement of said valve by the relative movement of the liquid chamber and partition.

2. Vehicle shock absorbing apparatus comprising a liquid chamber, an imperforate partition therein movable relatively thereto, means for connecting one of the said parts to the vehicle running gear and the other to the vehicle body, a buffer chamber, a liquid passageway connecting the liquid and buffer chambers, a valve in said passageway, and means for controlling the opening and closing movements of said valve by the relative movements of the liquid chamber and partition.

3. Vehicle shock absorbing apparatus comprising a liquid chamber, a partition therein movable relatively thereto, means for connecting one of the said parts to the vehicle running gear and the other to the vehicle body, a buffer chamber, a liquid passageway connecting the liquid and buffer chambers, and an auxiliary buffer chamber opening into the liquid chamber.

4. Vehicle shock absorbing apparatus comprising a liquid chamber, a partition therein movable relatively thereto, means for connecting one of the said parts to the vehicle running gear and the other to the vehicle body, a buffer chamber, a liquid passageway connecting the liquid and buffer chambers, a valve in said passageway, means for controlling the closing movement of said valve by the relative movement of the liquid chamber and partition, and an auxiliary buffer chamber opening into the liquid chamber.

5. Vehicle shock absorbing apparatus comprising a liquid chamber, a partition therein movable relatively thereto, means for connecting one of the said parts to the vehicle running gear and the other to the vehicle body, a buffer chamber, a liquid passageway connecting the liquid and buffer chambers, a valve in said passageway, means for controlling the opening and closing movements of said valve by the relative movements of the liquid chamber and partition, and an auxiliary buffer chamber opening into the liquid chamber.

6. Vehicle shock absorbing apparatus comprising a cylinder, an imperforate piston movable therein, means for connecting one of the said parts to the vehicle running gear and the other to the vehicle body, a buffer chamber, a liquid passageway connecting the buffer chamber and cylinder, a valve in said passageway, means for controlling the closing movement of said valve from the relative movement of the piston and cylinder.

7. Vehicle shock absorbing apparatus comprising a cylinder, an imperforate piston movable therein, means for connecting one of the said parts to the vehicle running gear and the other to the vehicle body, a buffer chamber, a liquid passageway connecting the buffer chamber and cylinder, a valve in said passageway, means for controlling the opening and closing movements of said valve from the relative movements of the piston and cylinder.

8. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, and an auxiliary buffer chamber opening into the liquid end of the cylinder.

9. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a valve in said passageway, means for controlling the closing movement of said valve from the relative movement of the piston and cylinder, and an auxiliary buffer chamber opening into the liquid end of the cylinder.

10. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a valve in said passageway, means for controlling the opening and closing movements of said valve from the relative movements of the piston and cylinder, an auxiliary buffer chamber opening into the liquid end of the cylinder.

11. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, and a breathing chamber open to the air and connected by a passageway with the non-liquid end of the cylinder.

12. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, means for controlling the closing movement of said valve from the relative movement of the piston and cylinder, and a breathing chamber open to the air and connected by a passageway with the non-liquid end of the cylinder.

13. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, an auxiliary buffer chamber opening into the liquid end of the cylinder, and a breathing chamber open to the air and connected by a passageway with the non-liquid end of the cylinder.

14. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, means for controlling the closing movement of said valve from the relative movement of the piston and cylinder, an auxiliary buffer chamber opening into the liquid end of the cylinder, and a breathing chamber open to the air and connected by a passageway with the non-liquid end of the cylinder.

15. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, a breathing chamber open to the air and connected by a passageway with the non-liquid end of the cylinder, and a passageway connecting the breathing chamber and buffer chamber and provided with means for pumping liquid from the former into the latter.

16. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, means for controlling the closing movement of said valve from the relative movement of the piston and cylinder, a breathing chamber open to the air and connected by a passageway with the non-liquid end of the cylinder, and a passageway connecting the breathing chamber and buffer chamber and provided with means for pumping liquid from the former into the latter.

17. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, an auxiliary buffer chamber opening into the liquid end of the cylinder, a breathing chamber open to the air and connected by a passageway with the non-liquid end of the cylinder, and a passageway connecting the breathing chamber and buffer chamber and provided with means for pumping liquid from the former into the latter.

18. Vehicle shock absorbing apparatus comprising a cylinder, a piston movable therein, means for connecting one of the said parts to the vehicle running gear and the other to the vehicle body, a buffer chamber, a liquid passageway connecting the buffer chamber and cylinder, a check-valve in said passageway opening toward the buffer chamber, means for controlling the closing movement of said valve from the relative movement of the piston and cylinder, an auxiliary buffer chamber opening into the liquid end of the cylinder, a breathing chamber open to the air and connected by a passageway with the non-liquid end of the cylinder, and a passageway connecting the breathing chamber and buffer chamber and provided with means for pumping liquid from the former into the latter.

19. Vehicle shock absorbing apparatus comprising a plurality of liquid chambers, each provided with an imperforate partition therein movable relatively thereto, means in each instance for connecting one of the said parts to the vehicle running gear and the other to the vehicle body, a buffer chamber, liquid passageways connecting each liquid chamber to the buffer chamber, a valve in each of said passageways, and means for controlling the closing movement of each valve by the relative movement of the liquid chamber and partition connected with its passageway.

20. Vehicle shock absorbing apparatus comprising a plurality of liquid chambers, each provided with an imperforate partition therein movable relatively thereto, means in each instance for connecting one of the said parts to the vehicle running gear and the other to the vehicle body, a buffer chamber, liquid passageways connecting each liquid chamber to the buffer chamber, a valve in each of said passageways, and means for controlling the opening and closing movements of each valve by the relative movements of the liquid chamber and partition connected with its passageway.

21. Vehicle shock absorbing apparatus comprising a plurality of liquid chambers, each provided with a partition therein movable relatively thereto, means in each instance for connecting one of the said parts to the vehicle running gear and the other to the vehicle body, a buffer chamber, liquid passageways connecting each liquid chamber to the buffer chamber, a valve in each of said passageways, means for controlling the closing movement of each valve by the relative movement of the liquid chamber and partition connected with its passageway, and an auxiliary buffer chamber opening into each liquid chamber.

22. Vehicle shock absorbing apparatus comprising a plurality of liquid chambers, each provided with a partition therein movable relatively thereto, means in each instance for connecting one of the said parts to the vehicle running gear and the other to the vehicle body, a buffer chamber, liquid passageways connecting each liquid chamber to the buffer chamber, a valve in each of said passageways, means for controlling the opening and closing movements of each valve by the relative movement of the liquid chamber and partition connected with its passageway, and a buffer chamber opening into each liquid chamber.

23. Vehicle shock absorbing apparatus comprising a series of cylinders, an imperforate piston movable within each cylinder, means for connecting each cylinder to the vehicle body, and each piston to the vehicle running gear, a buffer chamber, liquid passageways connecting each cylinder to the buffer chamber, a check-valve in each of said passageways opening toward the buffer chamber, and means for controlling the closing movement of said valve from the movement of the piston.

24. Vehicle shock absorbing apparatus comprising a series of cylinders, a piston movable within each cylinder, means for connecting each cylinder to the vehicle body, and each piston to the vehicle running gear, a buffer chamber, liquid passageways connecting each cylinder to the buffer chamber, a check-valve in each of said passageways opening toward the buffer chamber, means for controlling the closing movement of said valve from the movement of the piston, and a breathing chamber open to the air and in communication with the non-liquid end of each cylinder.

25. Vehicle shock absorbing apparatus comprising a series of cylinders, a piston movable within each cylinder, means for connecting each cylinder to the vehicle body, and each piston to the vehicle running gear, a buffer chamber, liquid passageways connecting each cylinder to the buffer chamber, a check-valve in each of said passageways opening toward the buffer chamber, means for controlling the closing movement of said valve from the movement of the piston, a breathing chamber open to the air and in communication with the non-liquid end of each cylinder, and a passageway from said breathing chamber into the buffer chamber provided with means for pumping liquid from the former into the latter.

26. Vehicle shock absorbing apparatus comprising a series of cylinders, a piston movable within each cylinder, means for connecting each cylinder to the vehicle body, and each piston to the vehicle running gear, a buffer chamber, liquid passageways connecting each cylinder to the buffer chamber, a check-valve in each of said passageways opening toward the buffer chamber, means for controlling the closing movement of said valve from the movement of the piston, and an auxiliary buffer chamber for each cylinder in communication therewith.

27. Vehicle shock absorbing apparatus comprising a cylinder, a piston movable therein, means for connecting one of the said parts to the vehicle body, a bell-crank lever mounted on the vehicle body and connected by one arm to the other of said parts, and provided on its other arm with an anti-friction roller adapted to rest upon the vehicle running gear.

28. Vehicle shock absorbing apparatus comprising a cylinder, a piston movable therein, means for connecting one of the said parts to the vehicle body, a bell-crank lever mounted on the vehicle body and connected by one arm to the other of said parts, and provided on its other arm with an anti-friction roller adapted to rest upon the vehicle running gear, a buffer chamber, a liquid passageway connecting the buffer chamber and cylinder, a check-valve in said passageway opening toward the buffer chamber, means for controlling the closing movement of said valve by the relative movement of the piston and cylinder.

29. Vehicle shock absorbing apparatus comprising a cylinder, a piston movable therein, means for connecting one of the said parts to the vehicle body, a bell-crank lever mounted on the vehicle body and connected by one arm to the other of said parts, and provided on its other arm with an anti-friction roller adapted to rest upon the vehicle running gear, a buffer chamber, a liquid passageway connecting the buffer chamber and cylinder, a check-valve in said passageway opening toward the buffer chamber, means for controlling the closing movement of said valve by the relative movement of the piston and cylinder, and an auxiliary buffer chamber opening into the liquid end of the cylinder.

30. Vehicle shock absorbing apparatus comprising a cylinder, a piston movable therein, means for connecting one of the said parts to the vehicle body, a bell-crank lever mounted on the vehicle body and connected by one arm to the other of said parts, and provided on its other arm with an anti-friction roller adapted to rest upon the vehicle running gear, and a casing attached to the vehicle body and inclosing the bell-crank lever and its connection to the part attached to the vehicle body.

31. Vehicle shock absorbing apparatus comprising a liquid chamber, a partition therein movable relatively thereto, means for connecting one of the said parts to the vehicle running gear and the other to the vehicle body, a buffer chamber, and a dual liquid passageway connecting the liquid and buffer chambers, check-valves in each branch of the dual passageway to permit flow of the liquid through the branches only in opposite directions.

32. Vehicle shock absorbing apparatus comprising a liquid chamber, a partition therein movable relatively thereto, means for connecting one of the said parts to the vehicle running gear and the other to the vehicle body, a buffer chamber, and a dual liquid passageway connecting the liquid and buffer chambers, check-valves in each branch of the dual passageway to permit flow of the liquid through the branches only in opposite directions, a check-valve at the exit of the liquid chamber into the liquid passageway opening toward the buffer chamber, and means for controlling the closing movement of said valve by the relative movement of the liquid chamber and partition.

33. Vehicle shock absorbing apparatus comprising a cylinder, a piston movable therein, means for connecting one of said parts to the vehicle running gear and the other to the vehicle body, a buffer chamber, a dual liquid passageway connecting the buffer chamber and cylinder, check-valves in the branches of the liquid passageway allowing movement of the liquid only in opposite directions in the branches.

34. Vehicle shock absorbing apparatus comprising a cylinder, a piston movable therein, means for connecting one of said parts to the vehicle running gear and the other to the vehicle body, a buffer chamber, a dual liquid passageway connecting the buffer chamber and cylinder, check-valves in the branches of the liquid passageway allowing movement of the liquid only in opposite directions in the branches, an auxiliary buffer chamber opening into the liquid end of the cylinder.

35. Vehicle shock absorbing apparatus comprising a cylinder, a piston movable therein, means for connecting one of said parts to the vehicle running gear and the other to the vehicle body, a buffer chamber, a dual liquid passageway connecting the buffer chamber and cylinder, check-valves in the branches of the liquid passageway allowing movement of the liquid only in opposite directions in the branches, an auxiliary buffer chamber opening into the liquid end of the cylinder, a check-valve at the exit from the liquid chamber into the passageway opening toward the buffer chamber, and means for controlling the closing movement of said valve by the relative movement of the piston and cylinder.

36. Vehicle shock absorbing apparatus comprising a cylinder, a piston movable therein, means for connecting one of the said parts to the vehicle body, a bell-crank lever mounted on the vehicle body and connected by one arm to the other of said parts, and supported by its other arm upon the vehicle running gear, and a casing attached to the vehicle body and inclosing the bell-crank lever and its connection to the part attached to the vehicle body.

In testimony whereof, I have signed my name to this specification, in the presence of two subscribing witnesses.

RALPH M. LOVEJOY.

Witnesses:
JOSEPH S. GRAVES,
DANIEL E. EATON.